United States Patent [19]

Whitford

[11] 4,288,727

[45] Sep. 8, 1981

[54] MODULAR MOTOR AND CONTROL MEANS AND METHOD

[75] Inventor: Darryl R. Whitford, Bedford Park, Australia

[73] Assignees: The Flinders University of South Australia; The Minister of Transport, State of South Australia, both of Adelaide, Australia

[21] Appl. No.: 939,952

[22] Filed: Sep. 6, 1978

[30] Foreign Application Priority Data

Sep. 7, 1977 [AU] Australia ............................ PD1537

[51] Int. Cl.³ ........................................... H02P 1/54
[52] U.S. Cl. .................................. 318/112; 318/111; 318/46; 318/49
[58] Field of Search .................... 318/34, 41, 45, 46, 318/5, 47, 105, 111, 49, 112; 323/2, 23, 25; 307/52, 53; 310/112, 114

[56] References Cited

U.S. PATENT DOCUMENTS

| | | | |
|---|---|---|---|
| 2,570,005 | 10/1951 | Pestarini | 310/112 X |
| 3,172,028 | 3/1965 | Dechet | 310/114 X |
| 3,466,455 | 9/1969 | Hecht et al. | 323/25 X |
| 3,524,986 | 8/1970 | Harnden, Jr. | 323/21 X |
| 4,082,971 | 4/1978 | Miyake et al. | 310/114 |

Primary Examiner—Ulysses Weldon
Attorney, Agent, or Firm—Norbert P. Holler; Charles A. Blank

[57] ABSTRACT

An arrangement of electric motors which are coupled together both mechanically and electrically comprises series pass elements and current sensing devices in the power circuits of the respective motors, each current sensing device having an output voltage which is proportional to its motor current, and which is applied to a respective linear operational amplifier having an output which controls the equivalent resistance of the series pass element (and thereby the magnitude of motor current). A single reference voltage is applied to all the linear operational amplifiers, so that, for example, if the motors are similar, each will transmit the same torque regardless of any difference in its internal impedance.

8 Claims, 3 Drawing Figures

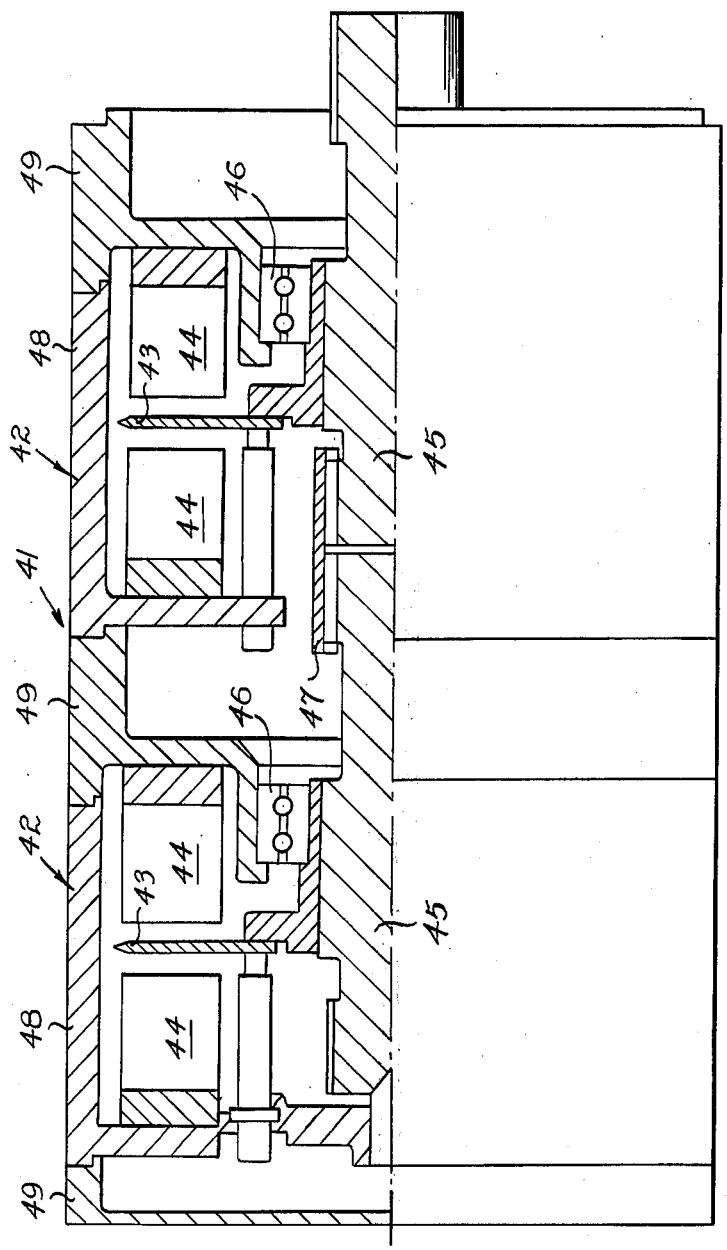

MODULAR MOTOR AND CONTROL MEANS AND METHOD

This invention relates to an arrangement wherein a plurality of electric motors are coupled both mechanically and electrically, and control means for the motors of that arrangement.

BACKGROUND OF THE INVENTION

A plurality of electric motors mechanically coupled to one another makes possible a means whereby increased power can be obtained from the motors by adding a further motor for example, but this has not been regarded as feasible with AC or DC motors (other than series wound DC motors) previously employed. For example if two shunt wound DC motors are coupled together and are fed with power, a minor difference in the impedance of the one motor will cause a corresponding difference in current flow through that motor, but if the motor were operating without being coupled to the other motor, the difference would be compensated for by speed, the back EMF automatically being adjusted by the speed so that the amount of power drawn by the motor is an almost linear function of the power being transmitted by the motor shaft. The slip speed of a squirrel cage or other AC motor will respond in a similar manner. With two motors coupled together, quite minor differences of impedance will result in unequal speeds for the same torque, or unequal torques for the same speed. Unfortunately the characteristics of electric motors are such that small impedance differences result in quite considerable differences in the power consumption for the same speed, and in extreme instances, there can be a circulation of current between the two motors.

One of the main objects of this invention is to provide control means whereby motors can be directly coupled mechanically in such a way that the combined torque output of all motors is the sum of the torques of the motors and the motors are substantially evenly loaded.

Another object of the invention is to provide improvements in the means whereby the motors are interconnected.

CROSS-REFERENCES OF THE INVENTION

In our U.S. patent application Ser. No. 28,219 (continuation of Ser. No. 777,414), the specification described and claimed an electric power control system for controlling the torque of a direct current electric motor, the system utilising a current sensing device in the motor power circuit having an output which constitutes a correction voltage proportional to current flow, a variable reference voltage control device having control means operable to vary the reference voltage, a linear operational amplifier coupled to both the correction voltage and reference voltage and having an output voltage which varied in response to differences between the correction and reference voltages, and a series pass transistor in the electrical power circuit, the equivalent resistance of which was a function of the amplifier output voltage. With this arrangement, any one reference voltage provided a current flow through the electrical power circuit which was approximately constant.

BRIEF SUMMARY OF THE INVENTION

In this invention, an arrangement of electric motors which are coupled together both mechanically and electrically comprises series pass elements and current sensing devices in the power circuits of the respective motors, each current sensing device having an output voltage which is proportional to its motor current, and which is applied to a respective linear operational amplifier having an output which controls the equivalent resistance of the series pass element (and thereby the magnitude of motor current). A single reference voltage is applied to all the linear operational amplifiers, so that, for example, if the motors are similar, each will transmit the same torque regardless of any difference in its internal impedance.

Specifically, the invention consists of an arrangement of electric motors which are coupled together both mechanically and electrically, comprising a reference voltage control device which controls a reference voltage, a series pass element and a current sensing device in the power circuit of each respective said motor, said current sensing device having an output which is a correction voltage proportional to the motor current flow, and a respective linear operational amplifier to which the correction voltage is applied, each said linear operational amplifier having an output voltage applied to its respective said series pass element so as to control the equivalent resistance thereof, said reference voltage being applied simultaneously to each said linear operational amplifier, and co-operating with the correction voltage applied thereto so as to control said output voltage thereof, and in turn control the respective motor currents.

In another aspect of the invention there is provided a bus system having conductors which convey command signals to control modules of respective motors which are mechanically coupled together, said command signals comprising a variable reference voltage, each control module comprising a series pass transistor and a current sensing device in the power circuit of the motor, the sensing device having a voltage output which is proportional to current flow and which constitutes a correction voltage, each control module comprising a linear operational amplifier coupled to both the correction voltage and the reference voltage and having an output voltage which varies in response to differences between the correction and reference voltages, said output voltage controlling the equivalent resistance of the series pass transistor.

In another aspect of the invention, motors are arranged with frames which interengage with one another and which are arranged to be joined together by clamping means, each motor having co-operable coupling means on the shaft which co-operates with mating coupling means of an identical shaft of an identical motor, each said motor being a printed circuit motor.

By combining the motor and control elements, a motor stack of the desired power may be obtained, whereby vehicles of differing configurations and requirements can be powered by similar motor control modules. This provides a flexibility of design of various electric vehicles and further provides a high production efficiency since only one type of motor and control element needs to be produced, stocked and serviced for a wide range of vehicle types.

BRIEF DESCRIPTION OF THE DRAWINGS

An embodiment of the invention is described hereunder in some detail with reference to, and is illustrated in, the accompanying drawings, in which FIG. 3 illustrates a "stack" of motors, showing two motors in half-section.

DETAILED DESCRIPTION OF THE DRAWINGS

Figure 1:
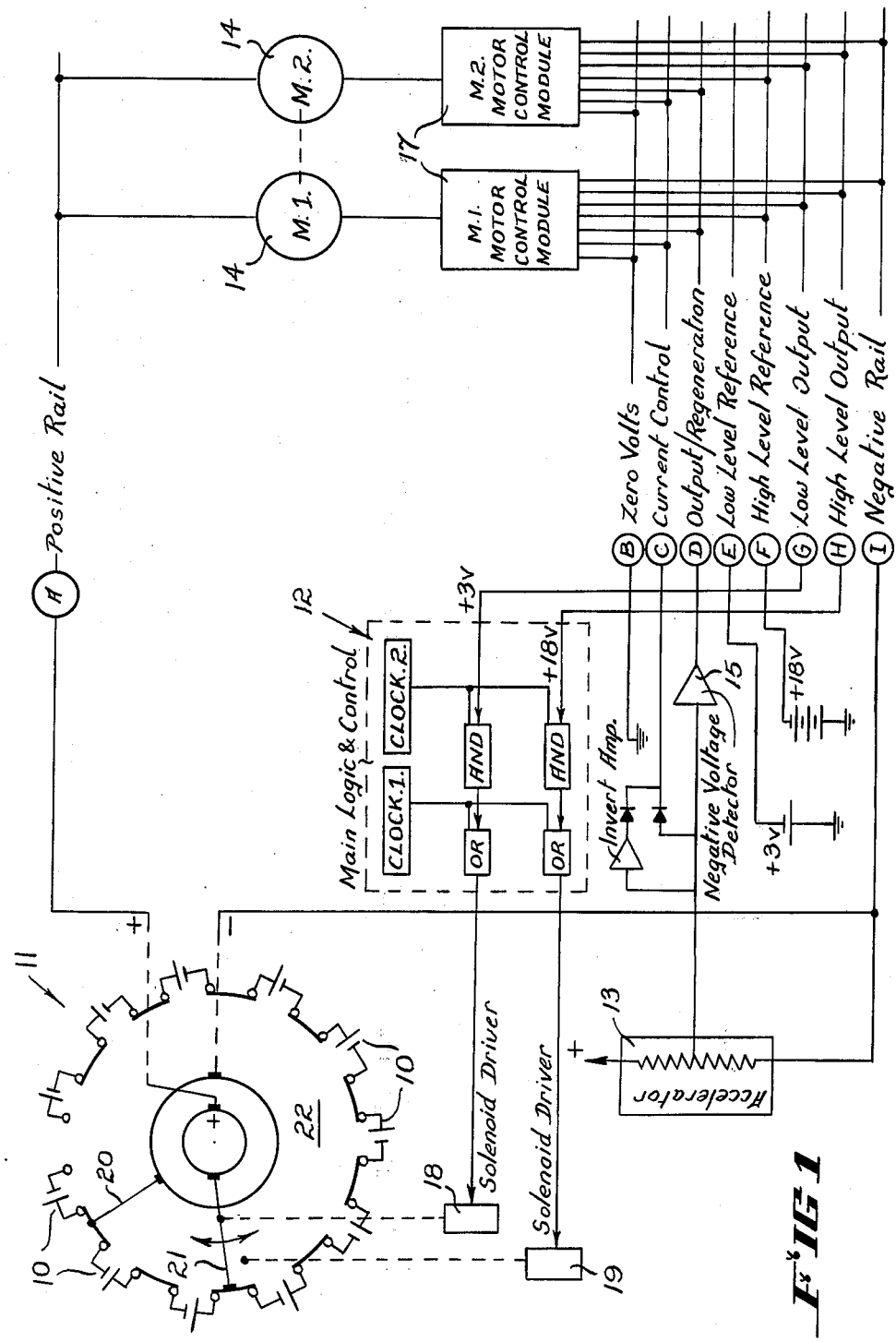
FIG. 1 is a schematic illustration showing the invention applied to vehicle motor arrangement which embodies the battery scanning device of our said U.S. patent application Ser. No. 28,219.

In this embodiment the operation of the batteries 10, preselector 11 and main control logic circuit 12 is in accordance with the specification which accompanied the U.S. patent application Ser. No. 28,219, filed Apr. 9, 1979 to which reference may be made. The circuit 12 has two conductors extending therefrom and designated G (low level limit of 3 volts) and H (high level limit of 18 volts).

A foot pedal operated "accelerator" 13 is a variable reference voltage control device which, upon variation of position, varies a reference voltage imparted to conductor C, which functions as a current control for each motor 14. The output of accelerator 13 also passes through an amplifier 15 arranged as a negative voltage detector, which controls a series of inverting switches 16 (FIG. 2) in respective motor control modules 17, through a conductor D (designated for output or regeneration).

Conductors E and F provide low level references (+3 volt) and high level references (+18 volts) respectively for each of the modules 17, while conductors G and H coupled to respective solenoid drivers 18 and 19 either separate the conductor 20 and contact 21 to add twelve volts, or bring them closer together to subtract a twelve volt battery, as disc 22 rotates, substantially as described in said specification Ser. No. 28,219. Conductor B connects to earth and is the zero voltage conductor, and positive and negative rails are designated A and I respectively.

Figure 2:
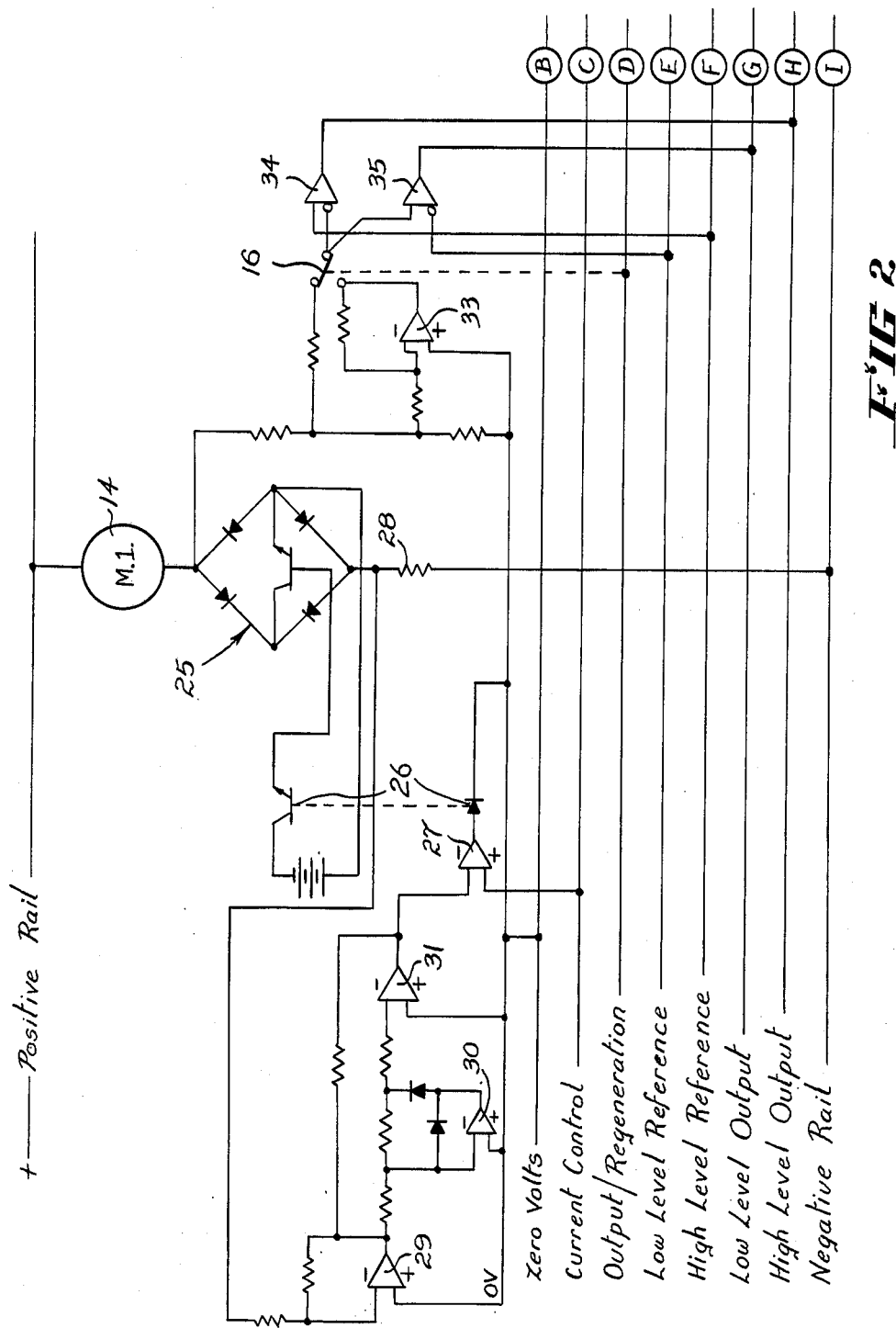
FIG. 2 shows a motor control module detail.

Reference is now made to FIG. 2. A series pass element can for example be a carbon pile, but is in this embodiment a series pass transistor circuit 25 contains a series pass transistor within a rectifier bridge, the transistor being controlled by an optically coupled isolator 26 from the output of an operational amplifier 27 (a 741 amplifier). It is necessary to use an isolator, since the output of the operational amplifier 27 must be positive relative to the base emitter junction of the series pass transistor, but when the circuit moves from the power to the regeneration mode the transistor is inverted. It is therefore necessary to "float" the series pass transistor 25.

Amplifier 27 is a current controlled comparator, comparing the input current reference voltage of current control conductor C with the voltage proportional to the motor current flowing through the resistance 28, which functions as a current sensing device. The linear operational amplifiers 29, 30 and 31 amplify and rectify the voltage across resistor 28, which is proportional to the motor current.

Thus if the voltage representing current through resistor 28 is greater than the reference voltage imparted by conductor C, then the series pass transistor 25 will turn to a more "OFF" resistance. If less, the series pass transistor 25 will go to a more "ON" resistance, keeping the current through 28 and therefore the motor 14 to a value represented by the magnitude of the input reference signal of conductor C, which is thereby the motor current control.

Since the current reference is fed to all modules then the current in all modules will be of a similar value.

The voltage across the series pass transistor 25 is fed in the non-inverted and inverted sense (via operational amplifier 33) to the switch 16. Switch 16 is controlled by the position relative to the centre of its movement of the "accelerator" pedal (or other signal control means) which is detected to give either an "output" or "regenerative" sense. Switch 16 serves to obtain the correct polarity to operate the dual comparators 34 and 35, whether in an "output" or "regenerative" power mode.

A reference voltage is fed to the comparators in such a magnitude that the comparator 35 is in the "OFF" state, if the series pass transistor voltage is greater than a low limit which is set for the circuit by conductor E (for example 3 volts). The comparator 34 is in the "ON" state for voltages less than the high limit of conductor F (for example 18 volts). Thus if the series pass voltage is less than 3 volts, comparator 35 will be turned "ON". If the voltage exceeds 18 volts however the comparator 34 will be turned "OFF". Since the output of the comparators is of the "open collector" type, this produces a logic such that if the series pass of each of any module connected to the signal bus becomes less than the low limit (3 volts) then the low level output line will go to a logical zero signifying to the preselector control an "increment" signal.

When the signal pass voltage exceeds 18 volts, the output of the high comparator will be turned "OFF". However since the high level output lines are connected to all modules, then the high level line will not go to a logical "1" until all the series pass elements of the modules have a voltage exceeding 18 volts. A logical "1" on the high level output will give a "decrement" signal to the preselector control.

Thus, if on accelerator command, a current control of, say 10 amps per motor is required and all motors are similar, then a voltage representing 10 amps in magnitude is fed to all the series pass control modules. Each series pass control will then control the current through each motor to be 10 amps. Any difference in the back EMF of a motor is compensated for by a varying voltage across respective series pass transistors. Therefore all motors will have an equal value of current, and thus deliver equal torque.

If the motors are of unequal size, the proper proportioning of current can still be achieved with a single reference voltage on conductor C, and the correction voltages across the relevant resistors 28 adjusted to suit the motors (by adjusting the values of resistors 28).

In another aspect this invention comprises a stack 41 of electric motors 42 as illustrated in FIG. 3. Each motor 42 is a printed motor having an armature 43 between coils 44, and has a shaft 45 journalled in bearings 46, the shafts being interconnected by non-circular sleeves 47. The motor frames 48 have end plates 49 which interconnect with frames 48 to form the stack 41, which can, for example, have four or five motors (although only two are shown). Clamping means (not shown) join the frames 48 together in the stack 41. This provides an efficient means for increasing horsepower.

A consideration of the above embodiment will indicate that the invention makes possible the standardised unit for a vehicle for example which may require one or a plurality of motors to meet its power requirements.

I claim:

1. An arrangement of electric motors which are coupled together both mechanically and electrically,
comprising a reference voltage control potentiometer which controls a reference voltage,
each respective said motor having a separate power circuit and a separate control module comprising a series pass element and a current sensing device in series with one another and with that said motor in the power circuit of that said motor, said series pass element having a control electrode, said current sensing device having an output voltage which is a correction voltage proportional to the motor current flow, a linear operational amplifier, and a conductor applying said correction voltage to said linear operational amplifier, isolator means connecting an output voltage of said linear operational amplifier to the control electrode of its respective said series pass element so as to control the equivalent resistance of that said series pass element,
a further conductor also applying said reference voltage simultaneously to each one of said linear operational amplifiers, and co-operating with the correction voltage applied to each respective said amplifier so as to control said output voltage of that said amplifier, and in turn control the respective motor currents.

2. An arrangement of electric motors according to claim 1 wherein said series pass element is a series pass transistor.

3. An arrangement of electric motors according to claim 1 wherein said circuit sensing device in each respective said power circuit is a resistor in series with the motor of that said circuit.

4. An arrangement of electric motors according to claim 1 wherein the motors are co-axial, having clamping means clamping the frames together and coupling means coupling the shafts together.

5. An arrangement of electric motors wherein the frames are interengaged with one another and joined together by clamping means, the shaft of each motor being joined to the shaft of an adjacent motor by coupling means,
a potentiometer controlling a reference voltage,
each respective said motor having a separate power circuit and a separate control module comprising a series pass transistor and a resistor in series with one another and with that said motor in the power circuit of that said motor, said series pass transistor having a control electrode, the voltage across the resistor being a correction voltage proportional to motor current flow in that said power circuit, a linear operational amplifier, and a conductor applying said correction voltage to said linear operational amplifier, an optically coupled isolator connecting an output voltage of said linear operational amplifier to the control electrode of its respective said series pass transistor so as to control the equivalent resistance of said series pass transistor,
a further conductor also applying said reference voltage simultaneously to each one of said linear operational amplifiers, and co-operating with the correction voltage applied to each respective said amplifier so as to control said output voltage of that said amplifier, and in turn control the respective motor currents.

6. An arrangement of electric motors according to claim 5 wherein each motor is similar to the other, each correction voltage the same as the other, and consequently each motor current is the same as the other.

7. An arrangement of electric motors according to claim 6 wherein each motor is a printed circuit motor.

8. An arrangement of electric motors which are coupled together mechanically and electrically, each motor having a power circuit and a control module, and comprising a bus system having conductors which convey a command signal to the control modules of respective said motors; said command signal comprising a variable reference voltage, each control module comprising a series pass transistor and a current sensing device in series with one another and with the said motor of that said module in the power circuit of that said motor, said series pass transistor having a control electrode, the sensing device having a voltage output which is proportional to current flow and which constitutes a correction voltage, each control module further comprising a linear operational amplifier and further conductors coupling said amplifier to both the correction voltage and the reference voltage whereby each amplifier has an output voltage which varies in response to the differences between the correction and reference voltages and an optically coupled isolator interconnecting that said amplifier to the control electrode of said series pass transistor so that said output voltage controls the equivalent resistance of the series pass transistor.

* * * * *